(12) United States Patent
Shoji et al.

(10) Patent No.: US 10,332,456 B2
(45) Date of Patent: Jun. 25, 2019

(54) VEHICULAR DISPLAY DEVICE AND DISPLAY METHOD OF VEHICULAR DISPLAY DEVICE

(71) Applicant: Yazaki Corporation, Tokyo (JP)

(72) Inventors: Kazumasa Shoji, Shizuoka (JP); Ryoko Sone, Shimada (JP); Masayuki Ichikawa, Shizuoka (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/805,271

(22) Filed: Nov. 7, 2017

(65) Prior Publication Data

US 2018/0218691 A1   Aug. 2, 2018

(30) Foreign Application Priority Data

Jan. 31, 2017   (JP) .................................. 2017-015350

(51) Int. Cl.
*G09G 5/10*         (2006.01)
*G09G 3/34*         (2006.01)
(Continued)

(52) U.S. Cl.
CPC ......... *G09G 3/3406* (2013.01); *G09G 3/3611* (2013.01); *G09G 3/3648* (2013.01); *G09G 5/00* (2013.01); *G09G 2320/066* (2013.01); *G09G 2320/0613* (2013.01); *G09G 2320/0646* (2013.01); *G09G 2340/0464* (2013.01);
(Continued)

(58) Field of Classification Search
CPC ...... G09G 3/34; G09G 3/3406; G09G 3/3611; G09G 3/3648; G09G 5/10; G09G 2320/0613; G09G 2320/0646; G09G 2320/066; G09G 2360/144
See application file for complete search history.

(56) References Cited

U.S. PATENT DOCUMENTS

| | | | |
|---|---|---|---|
| 6,415,224 B1* | 7/2002 | Wako ................. | G01C 21/3611 340/903 |
| 2005/0154505 A1* | 7/2005 | Nakamura ........... | G01C 21/365 701/1 |

(Continued)

FOREIGN PATENT DOCUMENTS

| | | |
|---|---|---|
| JP | 04-328420 A | 11/1992 |
| JP | 2000-221915 A | 8/2000 |

(Continued)

OTHER PUBLICATIONS

Communication dated Mar. 19, 2019, issued by the Japan Patent Office in corresponding Japanese Application No. 2017-015350.

*Primary Examiner* — Joe H Cheng
(74) *Attorney, Agent, or Firm* — Sughrue Mion, PLLC

(57) ABSTRACT

A vehicular display device includes an image display device that is arranged in front of a driver in a vehicle and that displays images. In a case in which the image display device interruptively displays a warning on a partial region of an image display region, the image display device displays, on the partial region, a warning image indicating warning content and a frame image surrounding the warning image. The image display device performs animation display to change at least one of the position and the shape of the frame image when starting display of the frame image.

12 Claims, 10 Drawing Sheets

(51) Int. Cl.
    *G09G 3/36* (2006.01)
    *G09G 5/00* (2006.01)
(52) U.S. Cl.
    CPC ..... *G09G 2340/10* (2013.01); *G09G 2340/12* (2013.01); *G09G 2340/14* (2013.01); *G09G 2360/144* (2013.01); *G09G 2380/10* (2013.01)

(56) References Cited

U.S. PATENT DOCUMENTS

| | | | | |
|---|---|---|---|---|
| 2006/0092001 | A1* | 5/2006 | Yokota | B60K 35/00 340/425.5 |
| 2010/0103204 | A1 | 4/2010 | Shibata et al. | |
| 2010/0253541 | A1* | 10/2010 | Seder | G01S 13/723 340/905 |
| 2010/0277299 | A1 | 11/2010 | Dolle | |
| 2011/0285525 | A1* | 11/2011 | Ishibashi | G09F 21/04 340/461 |
| 2013/0307986 | A1* | 11/2013 | Numata | B60R 1/00 348/148 |
| 2014/0125709 | A1 | 5/2014 | Shibata et al. | |
| 2015/0158387 | A1* | 6/2015 | Satoh | G01D 11/28 345/589 |
| 2016/0266767 | A1* | 9/2016 | Mizuguchi | B60K 35/00 |
| 2017/0187963 | A1* | 6/2017 | Lee | G06F 3/013 |
| 2017/0253181 | A1* | 9/2017 | Choi | B60Q 9/008 |
| 2017/0309248 | A1* | 10/2017 | Mori | B60K 35/00 |
| 2018/0032824 | A1* | 2/2018 | Yamamoto | B60R 1/00 |
| 2018/0215264 | A1* | 8/2018 | Shoji | B60K 35/00 |
| 2018/0370435 | A1* | 12/2018 | Konno | B60R 1/00 |

FOREIGN PATENT DOCUMENTS

| | | |
|---|---|---|
| JP | 2008-158497 A | 7/2008 |
| JP | 2010-072383 A | 4/2010 |
| JP | 2011-501716 A | 1/2011 |
| JP | 2014-221599 A | 11/2014 |
| JP | 2015-021730 A | 2/2015 |

* cited by examiner

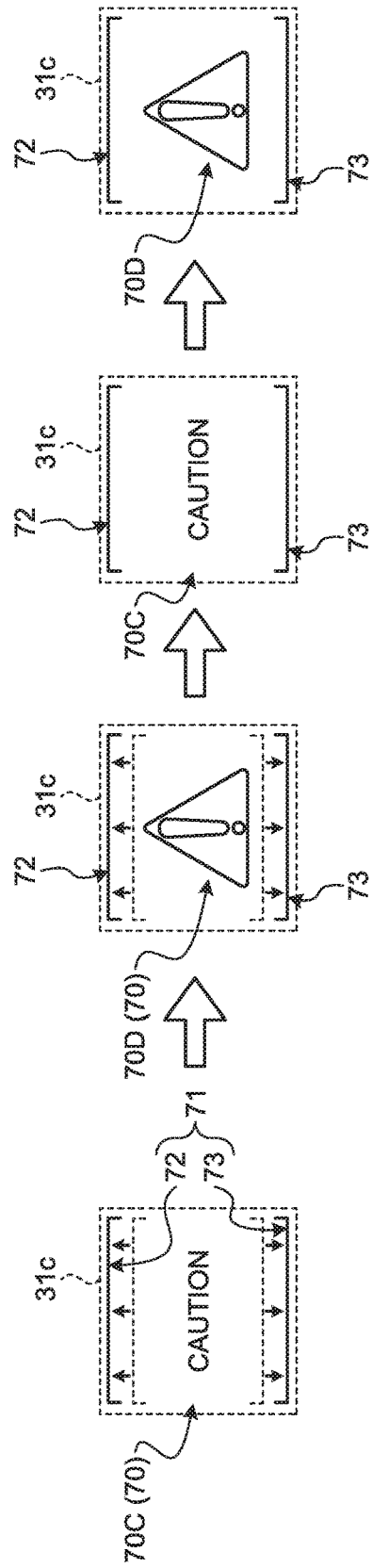

VEHICULAR DISPLAY DEVICE AND DISPLAY METHOD OF VEHICULAR DISPLAY DEVICE

CROSS-REFERENCE TO RELATED APPLICATION(S)

The present application claims priority to and incorporates by reference the entire contents of Japanese Patent Application No. 2017-015350 filed in Japan on Jan. 31, 2017.

BACKGROUND OF THE INVENTION

1. Field of the Invention

The present invention relates to a vehicular display device and a display method of the vehicular display device.

2. Description of the Related Art

Some vehicular display devices conventionally display a warning image. Japanese Patent Application Laid-open No. 2008-158497 discloses a technology of a vehicular display device in which a liquid crystal panel illuminated by a light source has a warning display pixel that displays a warning image at the time of occurrence of an anomaly as a particular time and a meter display pixel that displays a meter image at the time of occurrence of an anomaly and at a normal time when the warning image is not displayed by the warning display pixel.

There is still room for improvement in causing a driver to recognize that a warning has been displayed. For example, it is desirable that, when display of a warning is started, a driver can readily notice the start of the warning display.

SUMMARY OF THE INVENTION

The present invention has been made in view of the above-mentioned circumstances and an object thereof is to provide a vehicular display device and a display method of the vehicular display device enabling a driver to appropriately recognize a start of warning display.

A vehicular display device according to one aspect of the present invention includes an image display device arranged in front of a driver in a vehicle and configured to display images, wherein when the image display device interruptively displays a warning on a partial region of an image display region, the image display device displays, on the partial region, a warning image indicating warning content and a frame image surrounding the warning image, and the image display device performs an animation display to change at least one of a position and a shape of the frame image when starting display of the frame image.

A display method of a vehicular display device according to another aspect of the present invention includes a step of interruptively displaying a warning on a partial region of an image display region in the vehicular display device, wherein at the step of interruptively displaying, a warning image indicating warning content and a frame image surrounding the warning image are displayed on the partial region, and animation display is performed to change at least one of a position and a shape of the frame image when display of the frame image is started.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 10A-10D are explanatory views illustrating warning displays according to a modification of the above embodiment.

DETAILED DESCRIPTION OF THE PREFERRED EMBODIMENTS

The following describes in detail a vehicular display device and a display method of the vehicular display device according to an embodiment of the present invention with reference to the drawings. Note that the embodiment does not limit the invention. Components in the embodiment described below include ones that a person skilled in the art can easily conceive of or ones that are substantially the same.

Embodiment

Figure 1:
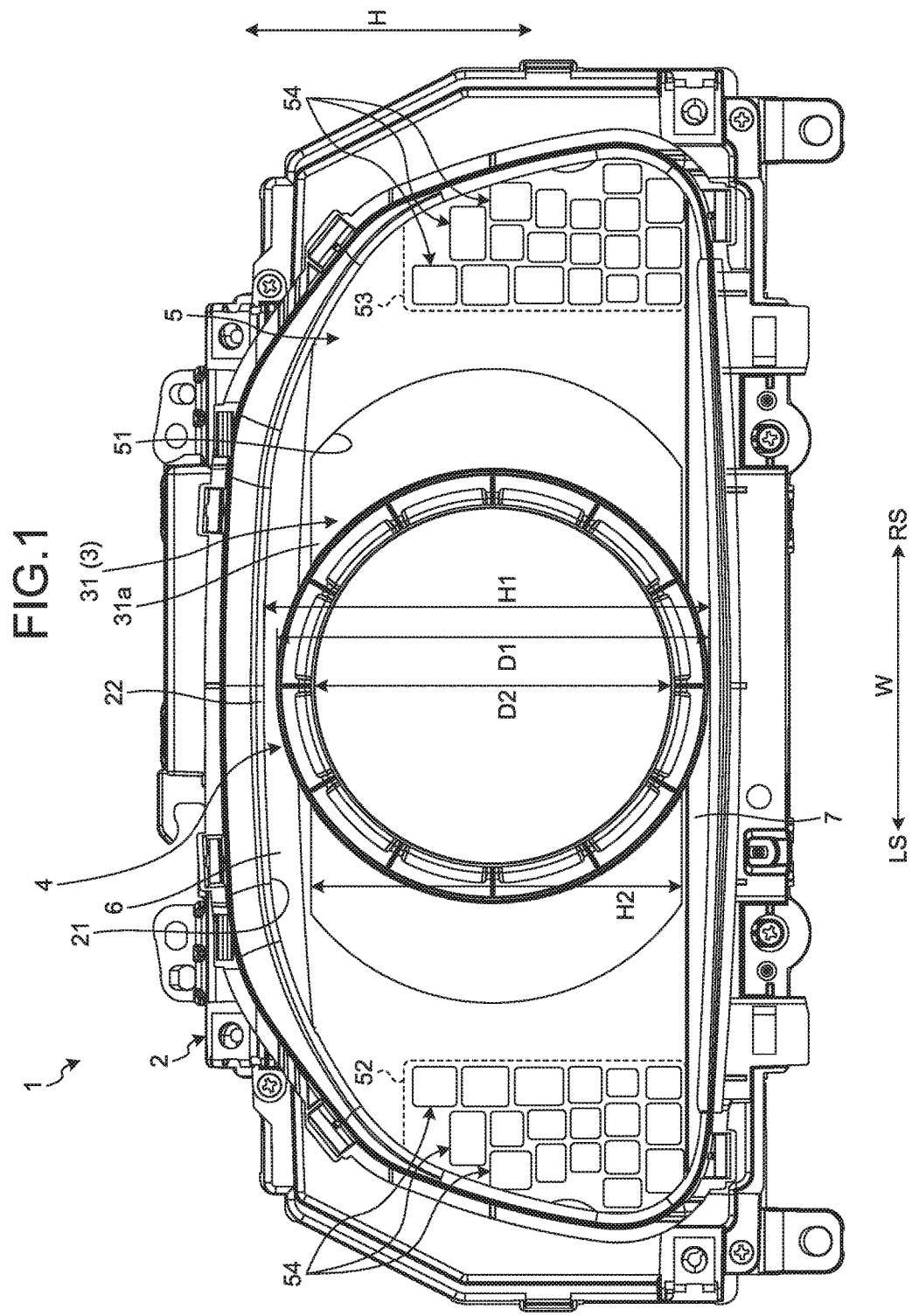
FIG. 1 is an elevation view illustrating a vehicular display device according to an embodiment.
Figure 2:
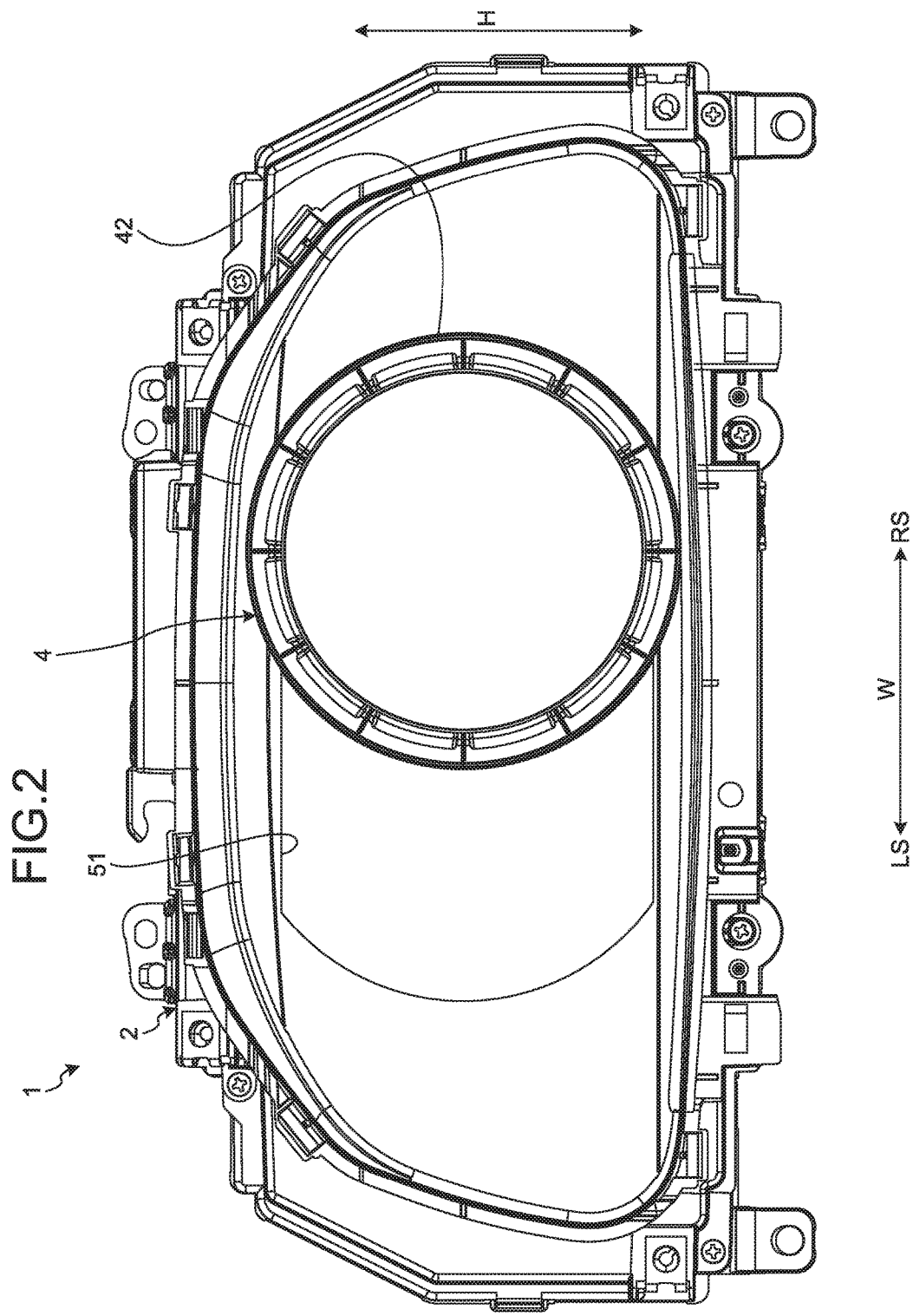
FIG. 2 is an elevation view illustrating a state in which a ring is in a second position in the vehicular display device according to the embodiment.
Figure 3:
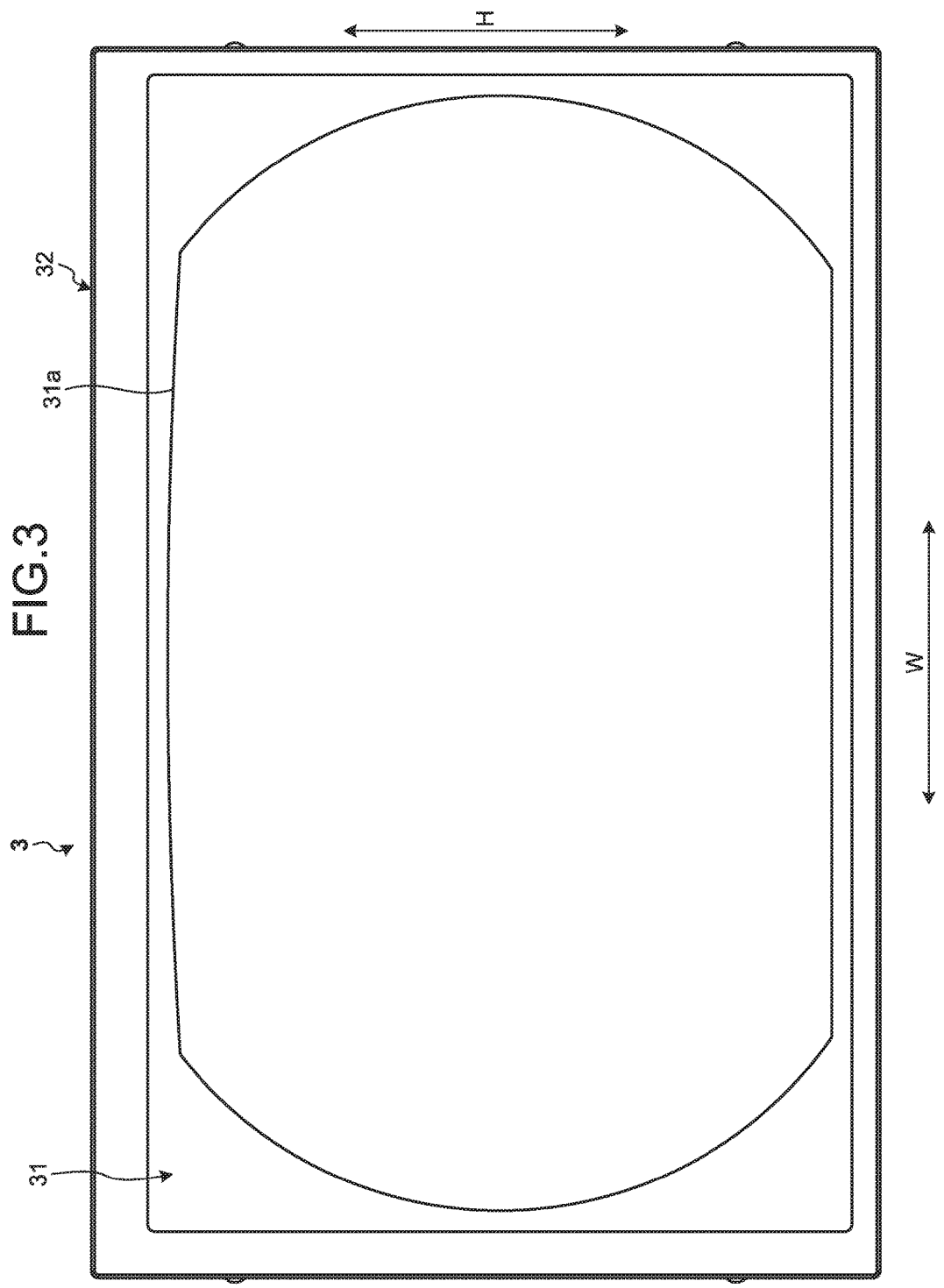
FIG. 3 is an elevation view illustrating an image display device according to the embodiment.
Figure 4:
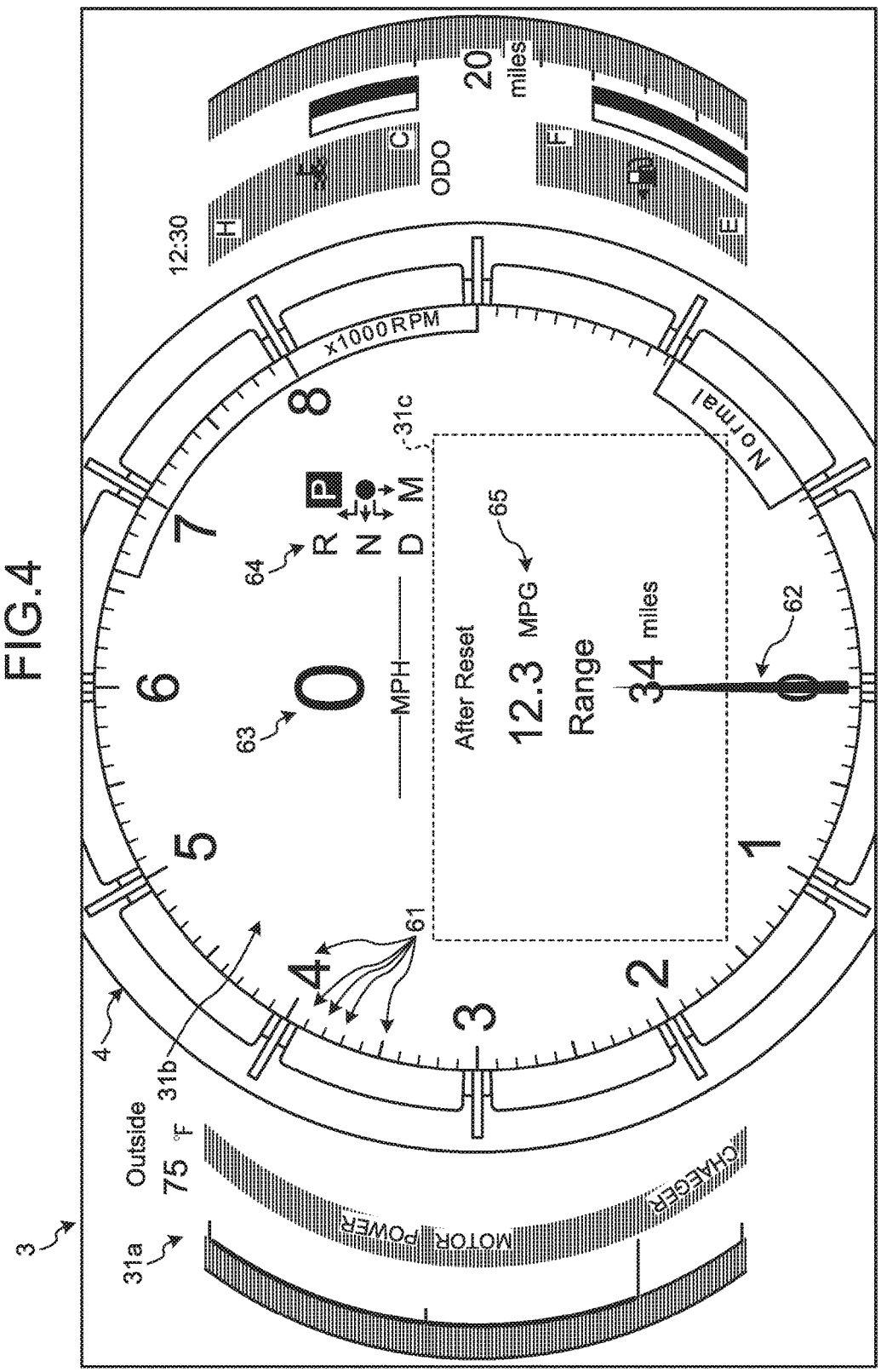
FIG. 4 is an elevation view illustrating normal display in the image display device of the embodiment.
Figure 5:
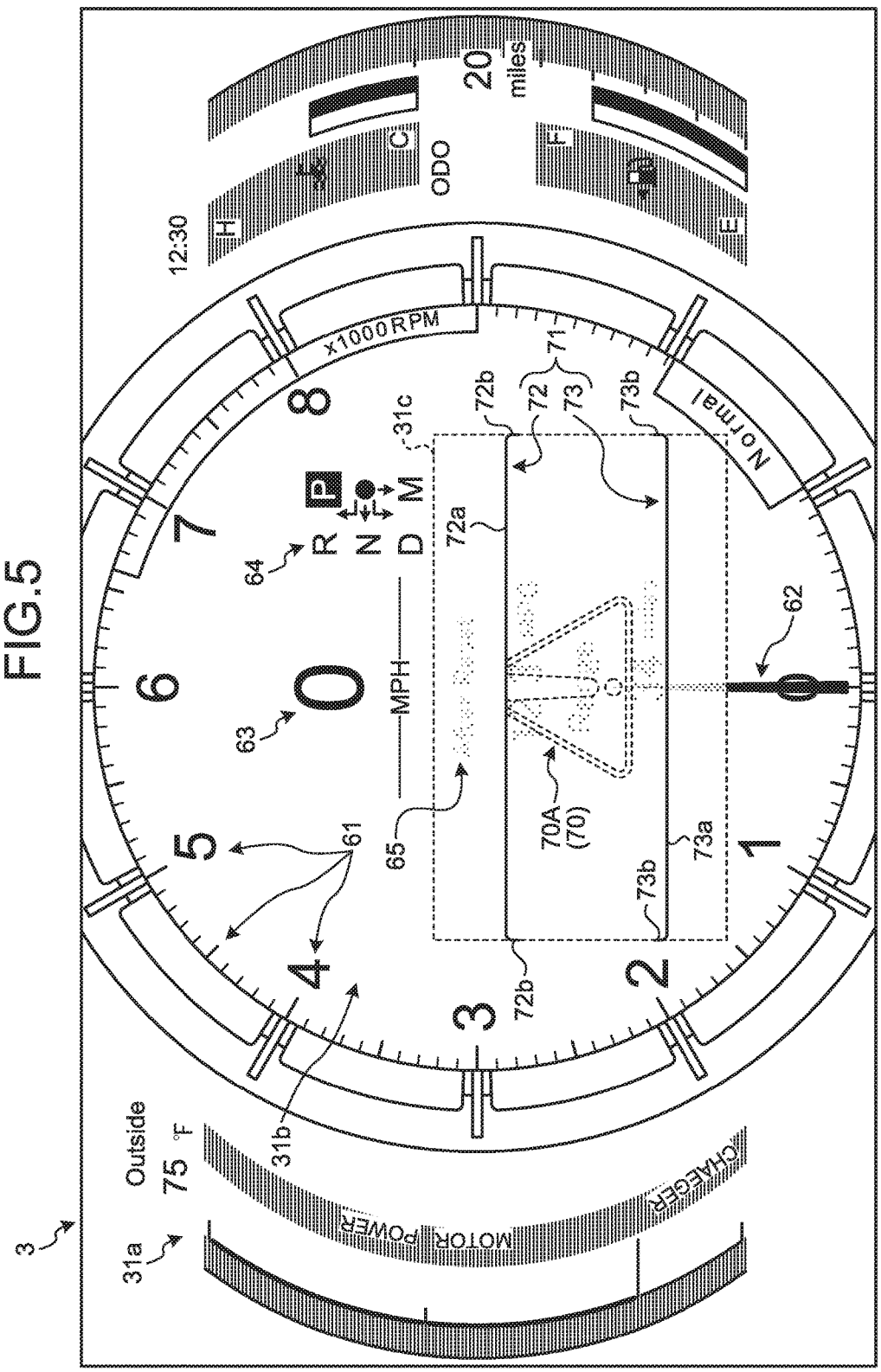
FIG. 5 is an elevation view illustrating start of warning display in the image display device of the embodiment.
Figure 6:
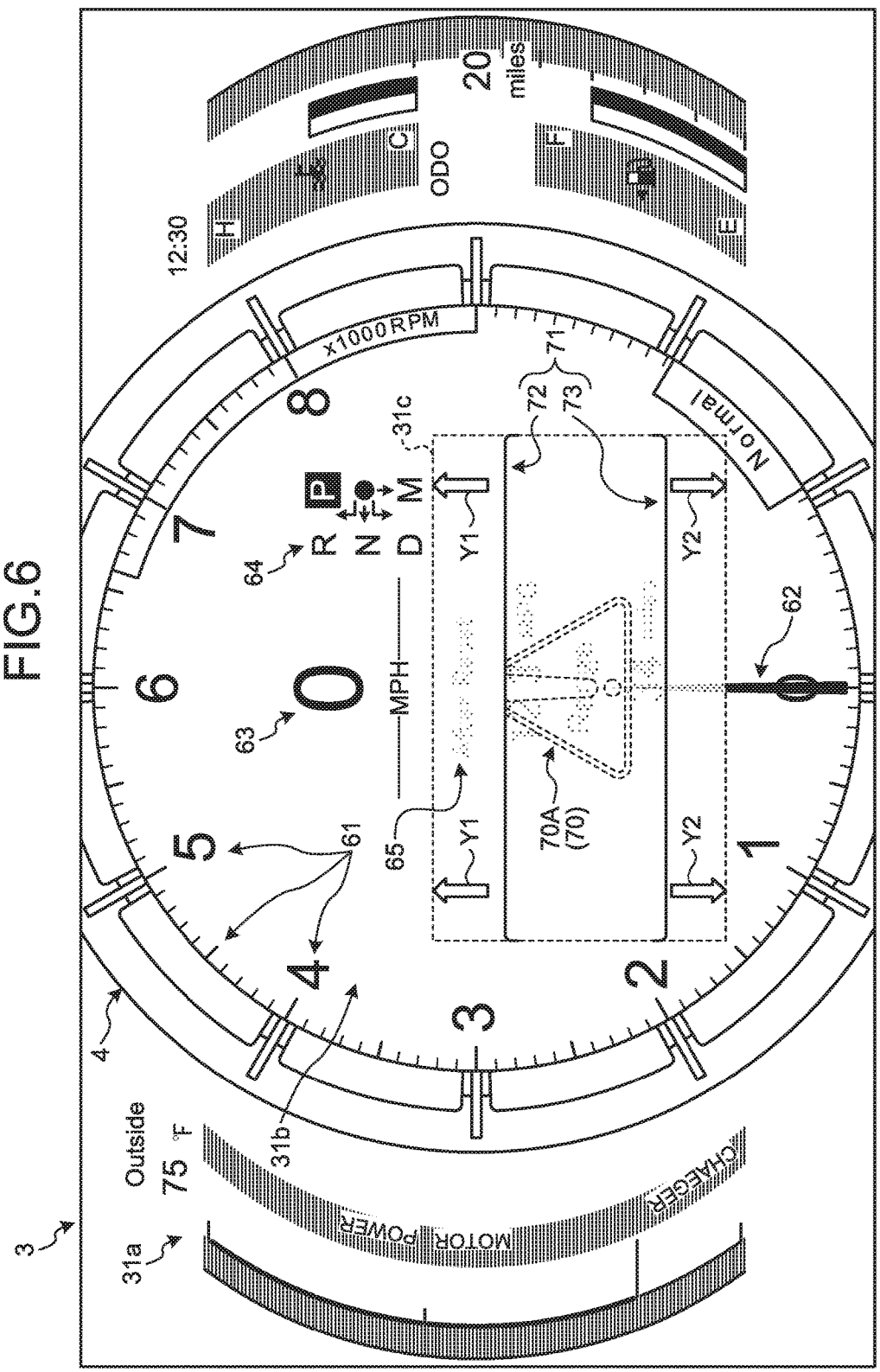
FIG. 6 is an explanatory view illustrating animation display in the image display device of the embodiment.
Figure 7:
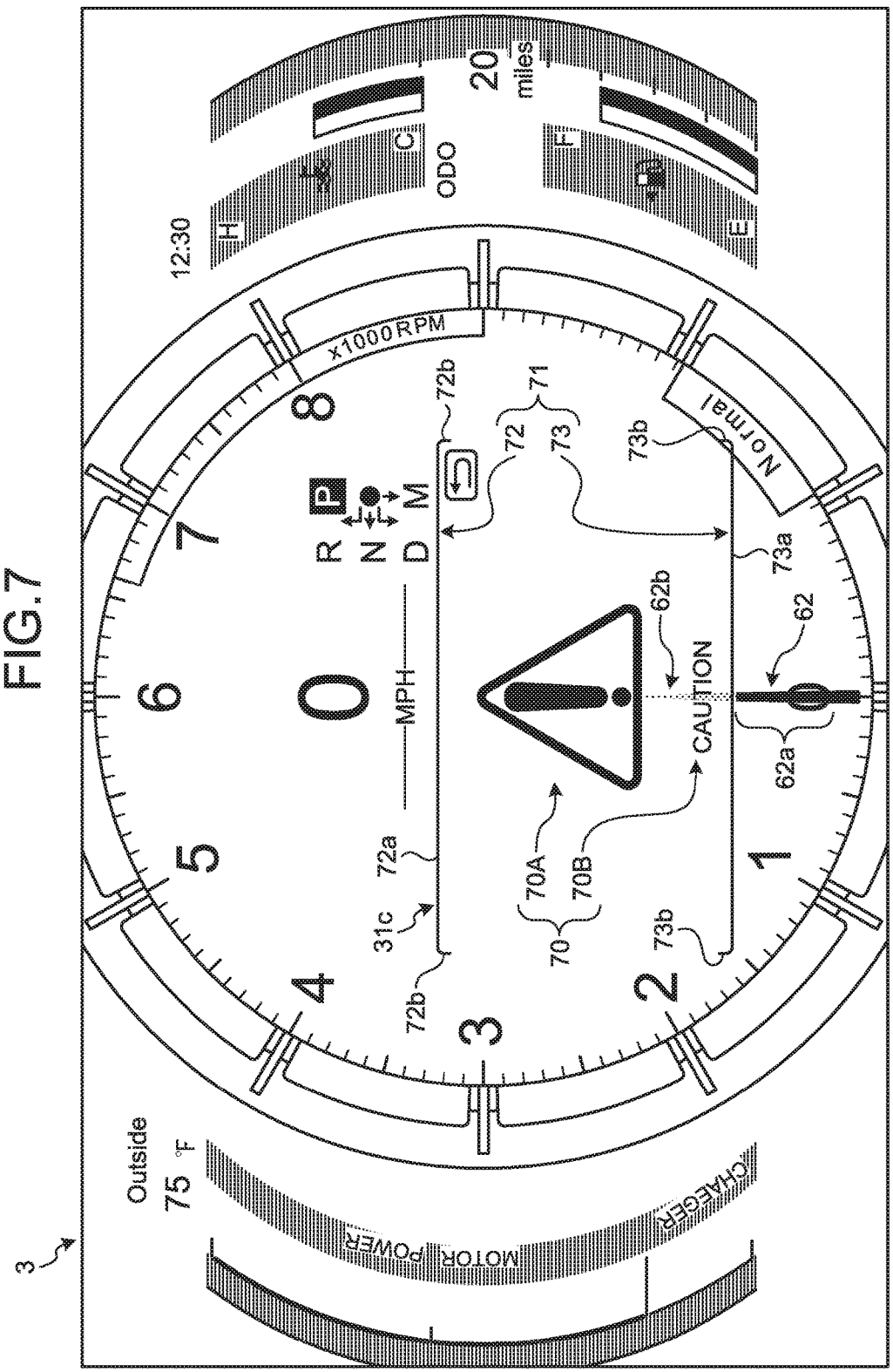
FIG. 7 is a view illustrating a state after the animation display in the image display device of the embodiment.

An embodiment is described with reference to FIGS. 1 to 9. The present embodiment relates to a vehicular display device and a display method of the vehicular display device. FIG. 1 is an elevation view illustrating the vehicular display device according to the embodiment. FIG. 2 is an elevation view illustrating a state in which a ring is in a second position in the vehicular display device according to the embodiment. FIG. 3 is an elevation view illustrating an image display device according to the embodiment. FIG. 4 is an elevation view illustrating normal display in the image display device of the embodiment. FIG. 5 is an elevation view illustrating start of warning display in the image display device of the embodiment. FIG. 6 is an explanatory view illustrating animation display in the image display device of the embodiment. FIG. 7 is a view illustrating a state after the animation display in the image display device of the embodiment.

As illustrated in FIG. 1, a vehicular display device 1 according to the present embodiment has a housing 2, an image display device 3, a ring 4, and a dial plate 5. The vehicular display device 1 of the present embodiment has a display function as a meter for a vehicle. The vehicular display device 1 is arranged in front of a driver in a vehicle, and is arranged in an instrument panel, for example.

The housing 2 houses therein and holds members and devices including the image display device 3, the ring 4, and the dial plate 5. The housing 2 has an opening 21. The housing 2 is arranged such that the opening 21 faces the driver side, in other words, the rear of the vehicle. Hereinafter, one side of the vehicular display device 1 that faces the back side in the back and forth direction of the vehicle is referred to as a "front side", and another side thereof that faces the front side in the back and forth direction of the vehicle as a "rear side". The vehicular display device 1 is arranged such that the front side faces the driver. The driver visually recognizes the image display device 3, the ring 4, and the dial plate 5 through the opening 21.

As illustrated in FIG. 1, the housing 2, when viewed from the driver in front thereof, has a rectangular shape in which the length thereof in a width direction W of the vehicle is larger than the length thereof in a vertical direction H of the vehicle. The housing 2 is formed of metal or synthetic resin, for example. On the front of the housing 2, a facing 22 is disposed to project from the opening 21 toward the front side. The facing 22 is a tubular component and is formed integrally with a main body portion of the housing 2. The front side of the facing 22 is blocked by a transparent cover.

The dial plate 5 is a plate-like member and is arranged so as to block the opening 21 from the rear side. The dial plate 5 is formed of synthetic resin, for example. The dial plate 5 is fixed to the housing 2. A window 51 is disposed in the central part of the dial plate 5. The window 51 is a portion that transmits light. The window 51 may be a through-hole that penetrates the dial plate 5, or may be a translucent region disposed in the dial plate 5. The window 51 has a horizontally long shape in which the length thereof in the width direction W of the vehicle is larger than the length thereof in the vertical direction H of the vehicle. The window 51 of the present embodiment has a shape in which the short-side portions of the rectangle are caused to project in a circular-arc shape toward the width direction W of the vehicle. The shape of the circular-arc portions of the window 51 corresponds to the shape of the ring 4.

Display design regions 52, 53 are disposed on both sides of the window 51 in the width direction W of the vehicle. The display design region 52 is arranged on one side of the window 51 in the width direction W of the vehicle, and the display design region 53 is arranged on the other side of the window 51 in the width direction W of the vehicle. A plurality of display designs 54 are arranged in both of the display design regions 52, 53. The display designs 54 are figures and characters that indicate a variety of information about the vehicle. The display designs 54 are outlined regions of printing on the dial plate 5, for example, and are translucent regions. Light sources are arranged for the respective display designs 54 on the rear side of the display design regions 52, 53. The display designs 54 display characters or figures by the corresponding light source being lit.

The image display device 3 is arranged on the rear side of the dial plate 5. The image display device 3 of the present embodiment is a liquid crystal display device such as a thin film transistor-liquid crystal display (TFT-LCD). As illustrated in FIG. 3, the image display device 3 includes a liquid crystal display part 31 and a frame member 32. The frame member 32 surrounds edges of the liquid crystal display part 31 and supports the liquid crystal display part 31.

The image display device 3 is arranged such that the liquid crystal display part 31 faces the front side thereof. A backlight unit is arranged on the rear side of the liquid crystal display part 31. The image display device 3 further includes a controller that controls the liquid crystal display part 31 and the backlight unit. The liquid crystal display part 31 displays any desired image in response to instructions from the controller. The image displayed on the liquid crystal display part 31 is projected to the front side by light emitted from the backlight unit.

The size of the window 51 in the dial plate 5 is smaller than the size of the liquid crystal display part 31. The window 51 faces the main part of the liquid crystal display part 31. The main part of the liquid crystal display part 31 is visually recognizable from the driver side through the window 51. The dial plate 5 shields the edges of the liquid crystal display part 31 and the frame member 32 that supports the liquid crystal display part 31, by the periphery of the window 51 from the driver side. In the liquid crystal display part 31, a region corresponding to the window 51 is referred to as an "image display region 31*a*" (see FIG. 3). The image display region 31*a* is a region in which a variety of images are displayed, and is a region visually recognizable from the driver side.

Referring back to FIG. 1, the ring 4 is a member arranged on the front side of the dial plate 5. The ring 4 of the present embodiment has an annular shape. An outside diameter D1 of the ring 4 is slightly smaller than a maximum width H1 of the opening 21 in the vertical direction H of the vehicle. An inside diameter D2 of the ring 4 is smaller than a width H2 of the window 51 in the vertical direction H of the vehicle. The upper end of the ring 4 is positioned closer to the upper side of the vehicle than the upper end of the window 51 is, and the lower end of the ring 4 is positioned closer to the lower side of the vehicle than the lower end of the window 51 is.

The ring 4 of the present embodiment is movable with respect to the dial plate 5 in the width direction W of the vehicle. More particularly, the upper end part of the ring 4 is coupled to a drive mechanism through an upper side holding member (not illustrated). The upper side holding member is shielded from the driver side by a cover member 6 attached to the housing 2. The drive mechanism includes a motor and a gear, and converts rotary torque generated by the motor into a driving force in the width direction W of the vehicle to transmit the force to the ring 4. The drive mechanism switches the rotation direction of the motor, thereby moving the ring 4 toward a left side LS or toward a right side RS in the width direction W of the vehicle.

The lower end part of the ring 4 is connected to a guide part through a lower side holding member (not illustrated). The lower side holding member is shielded from the driver side by a cover member 7 attached to the housing 2. The guide part is a guide rail, for example, that extends along the width direction W of the vehicle. The guide part defines the movable range of the ring 4 in the width direction W of the vehicle. The ring 4 of the present embodiment is movable in the width direction W of the vehicle between the first position illustrated in FIG. 1 and the second position illustrated in FIG. 2. The first position is a limit position to which the ring 4 can be moved toward the left side LS of the vehicle. The second position is a limit position to which the ring 4 can be moved toward the right side RS of the vehicle.

The first position in the present embodiment is a central part of the opening 21 in the width direction W of the vehicle. The first position is also a central part of the window 51 in the width direction W of the vehicle. The second position in the present embodiment is a position closer to the end part of the opening 21 on the right side RS of the vehicle. The second position is an end part of the window 51 on the right side RS of the vehicle. More specifically, a right end part 42 of the ring 4 in the second position overlaps a right end part of the window 51, as illustrated in FIG. 2.

As illustrated in FIG. 4, the image display device 3 displays scale images 61, an indicating needle image 62, a vehicle speed image 63, a shift position image 64, and a traveling information image 65, for example, on the image display region 31a. The image display device 3 displays these images 61, 62, 63, 64, and 65 on an inside region 31b that is a region inside the ring 4. The inside region 31b is a portion of the image display region 31a. The position of the inside region 31b may vary depending on the movement of the ring 4 along the width direction W of the vehicle. However, the position of the inside region 31b is not limited thereto. The inside region 31b may be in a position in which the inside region 31b is surrounded when the ring 4 is in the first position, or in a position in which the inside region 31b is surrounded when the ring 4 is in the second position.

The scale images 61 are each displayed as an index of the physical quantity corresponding to the output speed of a driving source mounted on the vehicle. In the present embodiment, the driving source is an engine, and the physical quantity corresponding to the output speed is an engine revolution speed [RPM]. The indicating needle image 62 is displayed as an index indicating the current value of the engine revolution speed. More specifically, the indicating needle image 62 is displayed so as to point a scale image 62 in a position corresponding to the current engine revolution speed, out of the scale images 61 arranged along the circumferential direction.

The vehicle speed image 63 is a numeric image indicating the current traveling speed of the vehicle. The vehicle speed image 63 is displayed in a position closer to the upper side in the vertical direction of the image from the center of the inside region 31b. The shift position image 64 is an image indicating the current shift position. The shift position image 64 is displayed on the right side of the vehicle speed image 63 in the horizontal direction of the image. The traveling information image 65 is an image of traveling information of the vehicle. The traveling information image 65 includes a numeral for a distance [miles] up to the present and a numeral for the current fuel economy [MPG]. The traveling information image 65 is displayed on the lower side of the vehicle speed image 63 and the shift position image 64 in the vertical direction of the image.

The vehicular display device 1 of the present embodiment displays a warning as an interrupt on a partial region 31c (see FIGS. 5 and 6) of the image display region 31a, as described with reference to FIGS. 5 to 7. In the following description, the partial region 31c is referred to as an "interrupt region 31c". In a case in which the vehicular display device 1 of the present embodiment interruptively displays a warning on the interrupt region 31c, the vehicular display device 1 displays a warning image 70 and a frame image 71 on the interrupt region 31c. The vehicular display device 1 performs animation display to change at least one of the position and the shape of the frame image 71 when starting display of the frame image 71. The frame image 71 is displayed in a form of animation, which enables the driver to readily notice that the warning image 70 has been displayed.

The interrupt region 31c of the present embodiment is a partial region of the inside region 31b. More particularly, the interrupt region 31c is a region from the central portion of the inside region 31b down to the lower portion of the inside region 31b. The interrupt region 31c of the present embodiment has a rectangular shape. The interrupt region 31c is a region on the lower side of the region in which the vehicle speed image 63 is displayed and a region in which the shift position image 64 is displayed. The interrupt region 31c is also a region overlapping the region in which the traveling information image 65 is displayed.

The warning image 70 of the present embodiment has a figure image 70A and a character image 70B, as illustrated in FIG. 7. The figure image 70A is an image of a figure indicating warning content. The character image 70B is an image of characters indicating the warning content. The warning content includes warnings about the driving source, a braking device, and a transmission of the vehicle, and warnings about a control system of the vehicle, for example. The warning image 70 may be one of the figure image 70A and the character image 70B. In the present embodiment, the figure image 70A is displayed in a position slightly closer to the upper side with respect to the center of the interrupt region 31c. The character image 70B is displayed on the lower side of the figure image 70A in the interrupt region 31c.

The frame image 71 of the present embodiment has an upper side frame image 72 and a lower side frame image 73. The upper side frame image 72 encloses the warning image 70 from the upper side. The lower side frame image 73 encloses the warning image 70 from the lower side. The upper side frame image 72 has a straight line 72a and projections 72b. The straight line 72a extends along the horizontal direction of the image from one end of the interrupt region 31c to the other end thereof. The projections 72b project from the respective ends of the straight line 72a toward the lower side of the image. The lower side frame image 73 has a straight line 73a and projections 73b. The straight line 73a extends along the horizontal direction of the image from one end of the interrupt region 31c to the other end thereof. The projections 73b project from the respective ends of the straight line 73a toward the upper side of the image. The upper side frame image 72 and the lower side frame image 73 face each other in the vertical direction of the image. A combination of the upper side frame image 72 and the lower side frame image 73 the shapes of which are symmetrical to each other causes a person who visually recognizes the frame image 71 to pay close attention to the rectangular region.

The image display device 3 of the present embodiment performs animation display to change at least one of the position and the shape of the frame image 71 when starting the display of the frame image 71. As illustrated in FIG. 5, when the display of the frame image 71 is started, the frame image 71 is displayed in a position closer to the center of the interrupt region 31c in the vertical direction of the image. The image display device 3 of the present embodiment causes the frame image 71 to be displayed simultaneously with the start of the display of the warning image 70. When the display is started, the upper side frame image 72 is displayed in a position closer to the lower side of the image than the upper end of the interrupt region 31c is. The lower side frame image 73 is displayed in a position closer to the upper side of the image than the lower end of the interrupt region 31c is. The display positions of the upper side frame image 72 and the lower side frame image 73 illustrated in FIG. 5 are each referred to as an "initial display position". The display positions of the upper side frame image 72 and the lower side frame image 73 illustrated in FIG. 7 are each referred to as a "final display position".

The image display device 3 displays the frame image 71 in a form of animation from the initial display position to the finial display position, as described with reference to FIG. 6. The image display device 3 gradually changes the display position of the upper side frame image 72 from the initial display position to the finial display position, as indicated by arrows Y1 in FIG. 6. The image display device 3 gradually changes the display position of the lower side frame image 73 from the initial display position to the finial display position, as indicated by arrows Y2 in FIG. 6, in accordance with the movement of the upper side frame image 72. That is to say, the image display device 3 performs animation display to expand the region surrounded by the frame image 71 in the vertical direction of the image.

The frame image 71 is displayed in a form of animation in this way, which enables the driver to readily notice that the frame image 71 has been displayed. The driver who has noticed that the frame image 71 has been displayed also notices the warning image 70 surrounded by the frame image 71. Consequently, the vehicular display device 1 of the present embodiment enables the driver to readily recognize start of display of a warning message.

The vehicular display device 1 of the present embodiment also causes the frame image 71 to fade in to be displayed. As illustrated in FIG. 5, the frame image 71 in the initial display position is displayed in lower luminance than the frame image 71 in the finial display position illustrated in FIG. 7. The image display device 3 gradually increases the luminance of the frame image 71 while displaying the frame image 71 in a form of animation. Animation display and fade-in display are combined, so that the driver can more readily recognize appearance of the frame image 71 and the warning image 70.

The image display device 3 of the present embodiment causes the image that has been displayed on the interrupt region 31c to fade out when causing the frame image 71 to fade in to be displayed. In the present embodiment, the image that has been displayed on the interrupt region 31c is the traveling information image 65. The image display device 3 changes the luminance of the traveling information image 65 to be lower than the luminance before the frame image 71 is displayed, simultaneously with displaying the frame image 71 in the initial display position, as illustrated in FIG. 5. The image display device 3 causes the traveling information image 65 to fade out while displaying the frame image 71 in a form of animation, as illustrated in FIG. 6. The image display device 3 finishes displaying the traveling information image 65 by the time the frame image 71 is moved to the finial display position.

The image display device 3 of the present embodiment displays part of the warning image 70 when starting display of the frame image 71. As illustrated in FIG. 5, when the frame image 71 is displayed in the initial display position, only the part of the warning image 70 that is surrounded by the frame image 71 is displayed. As animation display of the frame image 71 causes the region surrounded by the frame image 71 to expand in the vertical direction of the image, the remainder of the warning image 70 is displayed in proportion to the expansion of the region. The animation display of the frame image 71 causes the warning image 70 to appear gradually in this way, which enables the driver to pay attention to the warning image 70.

The image display device 3 of the present embodiment performs transparent animation of the indicating needle image 62. In the transparent animation, the image display device 3 displays the indicating needle image 62 as if the indicating needle image 62 existed on the rear side of the interrupt region 31c. The transparent animation is intended to produce a feeling as if a transparent member corresponding to the interrupt region 31c is arranged on the front side of the indicating needle image 62, for example. The image display device 3 causes the luminance of a portion 62b of the indicating needle image 62 displayed on the interrupt region 31c to be lower than the luminance of a portion 62a displayed outside the interrupt region 31c, as illustrated in FIG. 7 and other figures. In the following description, the portion 62b displayed on the interrupt region 31c is simply referred to as a "superposed portion 62b", and the portion 62a displayed outside the interrupt region 31c is simply referred to as an "exposed portion 62a". The image display device 3 performs mask processing on the superposed portion 62b in order to decrease the transmissivity. The luminance of the superposed portion 62b after mask processing is such luminance that is visually recognizable from the driver. That is to say, the image display device 3 decreases the luminance of the superposed portion 62b within the range visually recognizable from the driver.

In a case in which the indicating needle image 62 pivots, the image display device 3 changes the shape of the exposed portion 62a and the shape of the superposed portion 62b in accordance with the pivot of the indicating needle image 62. Thus, it looks to the driver as if the warning image 70 and the frame image 71 appear on the front side in front of the indicating needle image 62. Consequently, the vehicular display device 1 of the present embodiment enables the driver to readily recognize the presence of a warning message.

When finishing the warning display, the image display device 3 of the present embodiment performs animation display reverse to the animation display performed at the start of the warning display. That is to say, the image display device 3 performs animation display to move the frame image 71 such that the upper side frame image 72 thereof and the lower side frame image 73 thereof approach each other along the vertical direction of the image, and then finishes displaying the frame image 71. The image display device 3 causes the warning image 70 and the frame image 71 to fade out when finishing the warning display. The fade-out is performed in parallel with the animation display of the frame image 71. Additionally, the traveling information image 65 is caused to fade in to be displayed in parallel with the fade-out of the warning image 70 and the frame image 71. Animation display and fade-out are performed when the warning display is finished, which enables the driver to readily recognize the end of the warning display.

Figure 8:
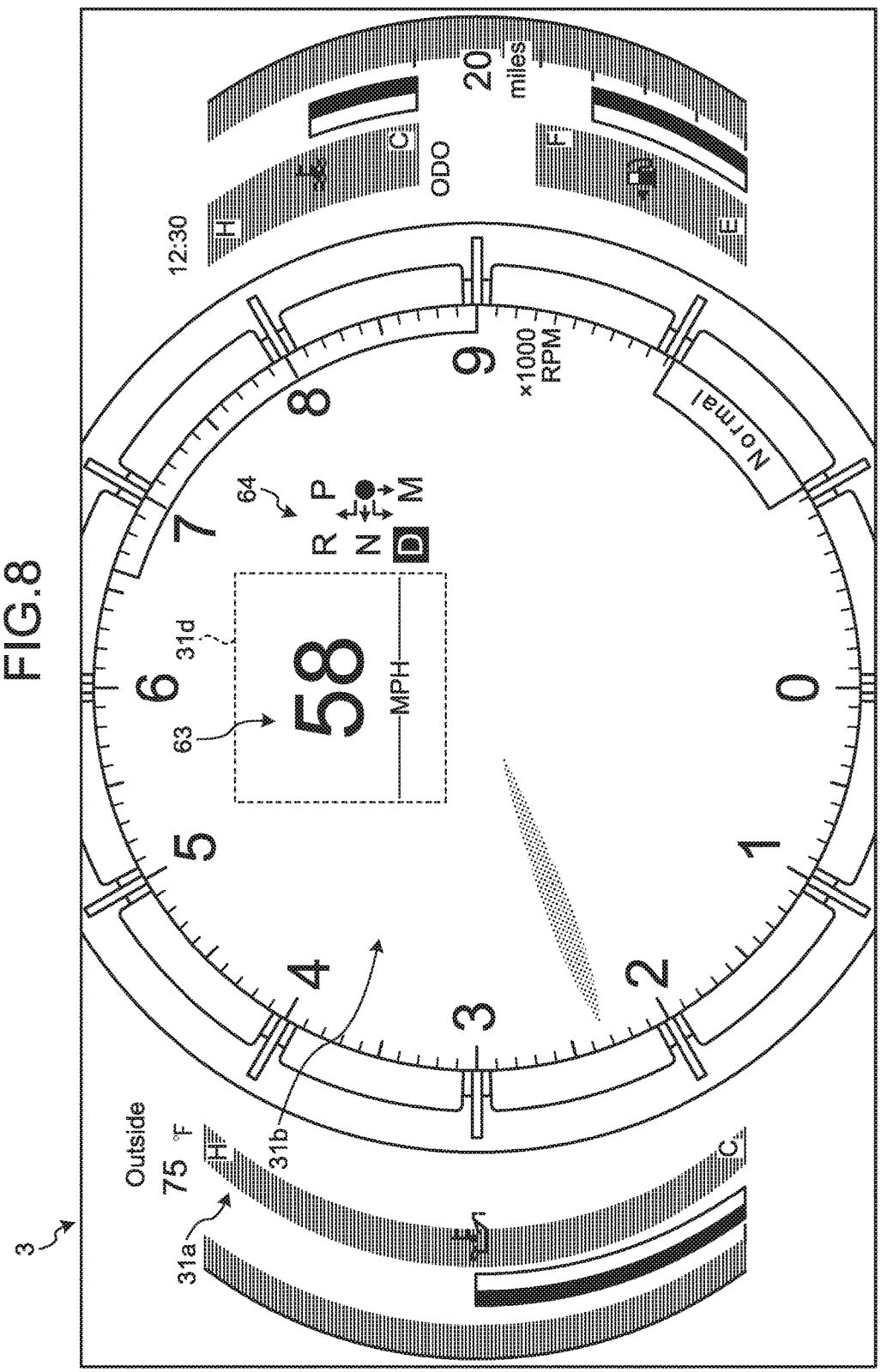
FIG. 8 is a view illustrating a normal variable region in the image display device of the embodiment.
Figure 9:
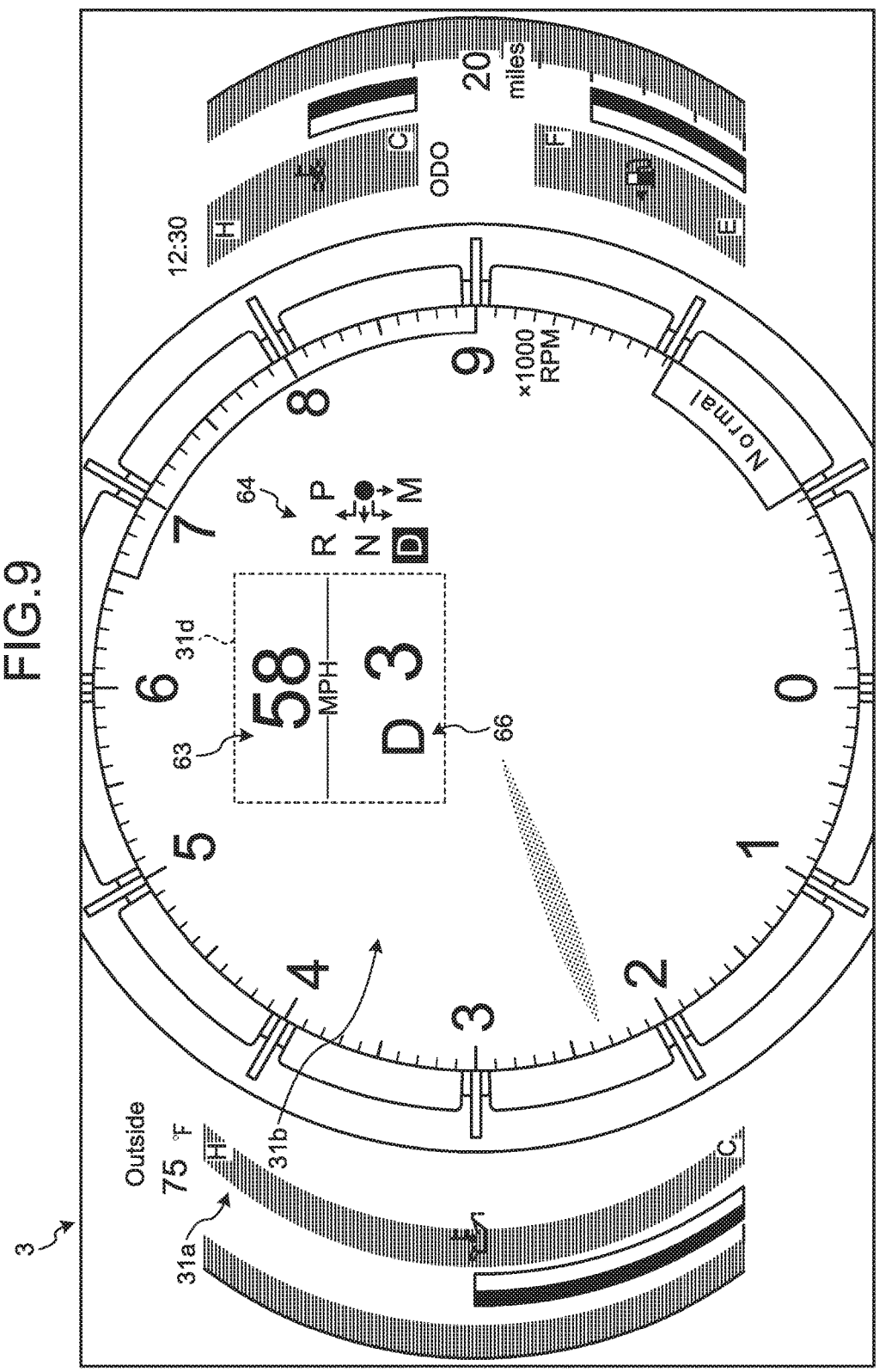
FIG. 9 is a view illustrating a variable region in which a gear position image is displayed.

The image display device 3 of the present embodiment changes gear position display in response to operation performed by the driver, as described with reference to FIGS. 8 and 9. The region indicated by the reference numeral 31d in FIGS. 8 and 9 is a variable region. The vehicle speed image 63 is displayed on the variable region 31d during normal traveling, as illustrated in FIG. 8. The vehicle speed image 63 is displayed in the center of the variable region 31d in large characters. In a case in which the gear position is changed by paddle shift operation performed by the driver or operation to shift the mode to manual mode is performed by the driver, a gear position image 66 is displayed on the variable region 31d in addition to the vehicle speed image 63, as illustrated in FIG. 9.

When displaying the gear position image 66, the image display device 3 displays the vehicle speed image 63 in a form of animation. The animation display of the vehicle speed image 63 is intended to reduce the character size of the vehicle speed image 63 while moving the vehicle speed image 63 toward the region in the upper part of the variable region 31d. The animation display of the vehicle speed image 63 allows the region in the lower part of the variable region 31d to be secured. The gear position image 66 is displayed on the region in the lower part of the variable region 31d. The image display device 3 performs the animation display of the gear position image 66 and the display of the vehicle speed image 63 in parallel. The image display device 3 causes the gear position image 66 to fade in to be displayed while moving the vehicle speed image 63. Furthermore, the image display device 3 may perform animation display to move the gear position image 66 in the same direction as the vehicle speed image 63.

In a case in which the driver changes the gear position by paddle operation or performs operation to shift the mode to manual mode, information about the current gear position has a high priority for the driver. In such a case, display of the gear position rather than digital vehicle speed is considered to be required by the driver by priority of displayed information. When priority of display is given to the gear position, the image display device 3 of the present embodiment displays the gear position image 66 on the variable region 31d, which enables necessary information to be appropriately provided to the driver. Limited display space can be effectively used by switching between the state in which the vehicle speed image 63 alone is displayed on the variable region 31d and the state in which the vehicle speed image 63 and the gear position image 66 are displayed on the variable region 31d in accordance with the traveling condition. The vehicular display device 1 of the present embodiment provides a meter that further arouses the driver to be more sports-minded by being capable of producing a feeling of operation that the driver becomes one with the vehicle.

As described above, the vehicular display device 1 of the present embodiment has the image display device 3 that is arranged in front of the driver in the vehicle and that displays images. In a case in which the image display device 3 interruptively displays a warning on the interrupt region 31c of the image display region 31a, the image display device 3 displays, on the interrupt region 31c, the warning image 70 indicating the warning content and the frame image 71. The frame image 71 is any desired image that surrounds the warning image 70. The image display device 3 performs animation display to change at least one of the position and the shape of the frame image 71 when starting the display of the frame image 71. The vehicular display device 1 of the present embodiment displays the frame image 71 in a form of animation, which enables the driver to appropriately recognize the start of the display of the warning image 70.

The image display device 3 of the present embodiment moves the frame image 71 from the position closer to the center of the interrupt region 31c toward the edges of the interrupt region 31c in the animation display of the frame image 71. In other words, the image display device 3 of the present embodiment moves the frame image 71 in a direction away from the warning image 70 in the animation display. Thus, the size of the interrupt region 31c can be effectively used in order to display the easily noticeable warning image 70.

The image display device 3 of the present embodiment further causes the frame image 71 to fade in to be displayed in the animation display of the frame image 71. Consequently, the start of the warning display can be readily recognized by the driver.

In the vehicular display device 1 of the present embodiment, the image display device 3 displays, on the image display region 31a, the indicating needle image 62 indicating the physical quantity corresponding to the output speed of the driving source of the vehicle. In a case in which the indicating needle image 62 overlaps the interrupt region 31c, the image display device 3 causes the luminance of the portion 62b of the indicating needle image 62 displayed on the interrupt region 31c to be lower than the luminance of the portion 62a displayed in an area other than the interrupt region 31c. Consequently, the indicating needle image 62 is visually recognizable while the warning image 70 is easy to recognize.

A display method of the vehicular display device of the present embodiment includes a step of interruptively displaying a warning on the interrupt region 31c in the vehicular display device 1. The step of interruptively displaying a warning is illustrated in FIGS. 5 to 7. The display method displays the warning image 70 indicating the warning content and the frame image 71 on the interrupt region 31c, and performs animation display to change at least one of the position and the shape of the frame image 71 when starting the display of the frame image 71 at the step of interruptively displaying a warning. The display method of the vehicular display device of the present embodiment produces an effect of enabling the driver to appropriately recognize the start of warning display.

Note that the method for finishing the display of the traveling information image 65 at the start of the warning display is not limited to fade-out. For example, the display of the traveling information image 65 may be instantly switched from ON to OFF. In this case, once the display of the traveling information image 65 is switched to OFF, the warning display may be started.

Display of the warning image 70 and display of the frame image 71 may be performed in such a manner that they are not started simultaneously. For example, the frame image 71 may be displayed first followed by the warning image 70 being displayed. In this case, the warning image 70 may be displayed in the middle of the animation display of the frame image 71, or the warning image 70 may be displayed after the animation display of the frame image 71 is finished.

The warning image 70 may be displayed earlier than the frame image 71. In this case, the frame image 71 is displayed with the warning image 70 already displayed, and the frame image 71 is displayed in a form of animation. In a case in which the warning image 70 is caused to fade in to be displayed, the frame image 71 may be displayed in the middle of the fade-in display of the warning image 70, the frame image 71 may be displayed simultaneously with the end of the fade-in display, or the frame image 71 may be displayed after the fade-in display is finished.

The frame image 71 may be one of the upper side frame image 72 and the lower side frame image 73. The frame image 71 may surround the warning image 70 in the horizontal direction of the image, in addition to surrounding the warning image 70 in the vertical direction of the image. The frame image 71 may have a closed shape surrounding the warning image 70, instead of the one that is not closed as in the present embodiment. For example, the frame image 71 may have a rectangular, polygonal (other than rectangular), or circular shape surrounding the warning image 70.

The shape of the frame image 71 is not limited to the exemplified shape. Although the frame image 71 of the present embodiment is part of a rectangle, alternatively, the frame image 71 may be part of a polygon or part of a circle, for example.

The animation display of the frame image 71 when the display is started is not limited to the exemplified display. For example, the moving direction of the frame image 71 in the animation display may be such a direction that the upper side frame image 72 thereof and the lower side frame image 73 thereof approach each other. In this case, the initial display position may be the outermost position in the interrupt region 31c. However, moving the frame image 71 from the position closer to the center of the interrupt region 31c toward the edges of the interrupt region 31c in the animation display, as exemplified in the present embodiment, has an effect of enabling the size of the warning image 70 to be set to be large. That is to say, the interrupt region 31c can be made best use of to display the warning image 70.

The image display device 3 may change the shape of the frame image 71 in the animation display, in addition to changing the position of the frame image 71, or instead of changing the position. For example, the image display device 3 may change the length of the frame image 71 in the horizontal direction of the image in the animation display. As an example, the frame image 71 may be extended in the horizontal direction of the image in the animation display when the display is started. The width of the frame image 71 may also be changed in the animation display.

The interrupt region 31c may be disposed in a portion other than the inside region 31b. For example, the interrupt region 31c may be disposed outside the ring 4 in the image display region 31a. The position of the interrupt region 31c is not necessarily fixed. The interrupt region 31c may be positioned in a region of the image display region 31a in which an image having a relatively low priority is displayed, for example.

Modification of the Embodiment

A modification of the embodiment is described. FIG. 10 is an explanatory view illustrating warning display according to a modification of the embodiment. In the modification, the image display device 3 alternately displays a plurality of warning images 70C, 70D, as illustrated in FIG. 10. When a plurality of warnings are displayed, the warning images 70C, 70D are alternately displayed in the single interrupt region 31c. Thus, the space for displaying warnings can be minimized.

When displaying a newly issued warning, the image display device 3 causes the driver to readily recognize that the warning is displayed for the first time. Specifically, in a case in which each of the warning images 70C, 70D is displayed in the interrupt region 31c for the first time, the image display device 3 displays the frame image 71 in a form of animation. In a case in which the warning images 70C, 70D are displayed in the interrupt region 31c for the second and subsequent times, the image display device 3 does not display the frame image 71 in a form of animation.

A method for displaying warnings in the modification is described with reference to FIG. 10.

(a) In a case in which the first warning image 70C is displayed in the interrupt region 31c for the first time, the image display device 3 displays the frame image 71 in a form of animation when starting the display of the frame image 71. The animation display enables the driver to be easily aware that the first warning image 70C is displayed for the first time.

(b) Next, the second warning image 70D is displayed in the interrupt region 31c for the first time. In this case, the image display device 3 displays the frame image 71 in a form of animation when starting the display of the frame image 71. The animation display enables the driver to be easily aware that the second warning image 70D is displayed for the first time. In other words, the driver can be easily aware that a warning has been newly issued.

(c) Next, the first warning image 70C is displayed in the interrupt region 31c again. For display of the second and subsequent times, the image display device 3 does not display the frame image 71 in a form of animation. Consequently, the driver can be easily aware that the first warning image 70C is not newly issued.

(d) Next, the second warning image 70D is displayed in the interrupt region 31c again. For display of the second and subsequent times, the image display device 3 does not display the frame image 71 in a form of animation.

As described above, in a case in which the warning images 70C, 70D are alternately switched to be displayed in the single interrupt region 31c, the image display device 3 of the present modification displays the frame image 71 in a form of animation when each of the warning images 70C, 70D is displayed in the interrupt region 31c for the first time. The image display device 3 of the present modification does not display the frame image 71 in a form of animation when the warning images 70C, 70D are displayed in the interrupt region 31c for the second and subsequent times. Thus, the image display device 3 of the present modification enables the driver to appropriately recognize the start of the display of the warning images 70C, 70D.

Note that the number of the warning images 70 that are alternately switched to be displayed may be three or more in the present modification.

The content disclosed in the embodiment and the modification described above can be executed in combination appropriately.

The vehicular display device according to the present embodiment includes the image display device that is arranged in front of the driver in the vehicle and that displays images. In a case in which the image display device interruptively displays a warning on a partial region of the image display region, the image display device displays, on the partial region, the warning image indicating the warning content and the frame image surrounding the warning image. The image display device performs animation display to change at least one of the position and the shape of the frame image when starting the display of the frame image. With the vehicular display device according to the present invention, the animation display produces an effect of causing the driver to pay attention to the warning image and enabling the driver to appropriately recognize the start of warning display.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicular display device comprising:
an image display device arranged in front of a driver in a vehicle and configured to display images, wherein
when the image display device interruptively displays a warning on a partial region of an image display region, the image display device displays, on the partial region, a warning image indicating warning content and a frame image surrounding the warning image,
the image display device performs an animation display to change at least one of a position and a shape of the frame image when starting display of the frame image, and
the image display device displays currently measured vehicle information on areas outside of the partial region of the image display region.

2. The vehicular display device according to claim 1, wherein the frame image is moved from a position closer to a center of the partial region to an edge of the partial region in the animation display.

3. The vehicular display device according to claim 2, wherein
the frame image is further caused to fade in to be displayed in the animation display.

4. The vehicular display device according to claim 2, wherein
the image display device displays, on the image display region, an indicating needle image indicating a physical quantity corresponding to an output speed of a driving source of the vehicle, and
when the indicating needle image overlaps the partial region, the image display device causes luminance of a portion of the indicating needle image displayed on the partial region to be lower than luminance of a portion displayed in an area other than the partial region.

5. The vehicular display device according to claim 2, wherein
when the image display device alternately switches and displays a plurality of warning images in the partial region, the image display device performs the animation display when each of the warning images is displayed in the partial region for a first time, and the image display device does not perform the animation display when the warning images are displayed in the partial region for second and subsequent times.

6. The vehicular display device according to claim 1, wherein
the frame image is further caused to fade in to be displayed in the animation display.

7. The vehicular display device according to claim 6, wherein
the image display device displays, on the image display region, an indicating needle image indicating a physical quantity corresponding to an output speed of a driving source of the vehicle, and
when the indicating needle image overlaps the partial region, the image display device causes luminance of a portion of the indicating needle image displayed on the partial region to be lower than luminance of a portion displayed in an area other than the partial region.

8. The vehicular display device according to claim 6, wherein
when the image display device alternately switches and displays a plurality of warning images in the partial region, the image display device performs the animation display when each of the warning images is displayed in the partial region for a first time, and the image display device does not perform the animation display when the warning images are displayed in the partial region for second and subsequent times.

9. The vehicular display device according to claim 1, wherein
the image display device displays, on the image display region, an indicating needle image indicating a physical quantity corresponding to an output speed of a driving source of the vehicle, and
when the indicating needle image overlaps the partial region, the image display device causes luminance of a portion of the indicating needle image displayed on the partial region to be lower than luminance of a portion displayed in an area other than the partial region.

10. The vehicular display device according to claim 9, wherein
when the image display device alternately switches and displays a plurality of warning images in the partial region, the image display device performs the animation display when each of the warning images is displayed in the partial region for a first time, and the image display device does not perform the animation display when the warning images are displayed in the partial region for second and subsequent times.

11. The vehicular display device according to claim 1, wherein
when the image display device alternately switches and displays a plurality of warning images in the partial region, the image display device performs the animation display when each of the warning images is displayed in the partial region for a first time, and the image display device does not perform the animation display when the warning images are displayed in the partial region for second and subsequent times.

12. A display method of a vehicular display device, the display method comprising:
a step of displaying currently measured vehicle information on areas outside of a partial region of an image display region,
a step of interruptively displaying a warning on the partial region of the image display region in the vehicular display device, wherein
during the step of interruptively displaying, a warning image indicating warning content and a frame image surrounding the warning image are displayed on the partial region, and animation display is performed to change at least one of a position and a shape of the frame image when display of the frame image is started.

* * * * *